(12) United States Patent
Maeno et al.

(10) Patent No.: US 6,722,481 B2
(45) Date of Patent: Apr. 20, 2004

(54) VIBRATION-DAMPING DEVICE

(75) Inventors: Hajime Maeno, Kasugai (JP); Koichi Maeda, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/254,138

(22) Filed: Sep. 24, 2002

(65) Prior Publication Data

US 2003/0057623 A1 Mar. 27, 2003

(30) Foreign Application Priority Data

Sep. 25, 2001 (JP) ........................................ 2001-290574

(51) Int. Cl.[7] .............................. F16F 15/02; F16F 15/04
(52) U.S. Cl. ...................... 188/379; 267/141; 267/292; 267/136; 188/378
(58) Field of Search ................................. 267/292, 293, 267/294, 141, 152, 153, 136, 140.11; 248/636, 638, 560, 632, 634, 562, 559; 188/378, 379, 380; 464/180; 180/311, 902, 300

(56) References Cited

U.S. PATENT DOCUMENTS

| | | | |
|---|---|---|---|
| 2,714,161 A | | 7/1955 | Featherstun |
| 3,612,222 A | | 10/1971 | Minor |
| 4,706,788 A | | 11/1987 | Inman et al. |
| 5,326,324 A | | 7/1994 | Hamada |
| 5,671,909 A | | 9/1997 | Hamada et al. |
| 5,884,902 A | * | 3/1999 | Hamada et al. ............. 267/141 |
| 6,439,359 B1 | * | 8/2002 | Kato et al. .................. 188/379 |
| 6,554,112 B2 | * | 4/2003 | Kato et al. .................. 188/379 |
| 6,598,718 B2 | * | 7/2003 | Kato et al. .................. 188/378 |
| 2001/0020761 A1 | | 9/2001 | Hasegawa |
| 2001/0022256 A1 | | 9/2001 | Misaji et al. |
| 2001/0026039 A1 | | 10/2001 | Hasegawa et al. |
| 2001/0032764 A1 | | 10/2001 | Hasegawa et al. |
| 2002/0030315 A1 | | 3/2002 | Kato et al. |
| 2002/0113351 A1 | * | 8/2002 | Kato et al. .................. 267/141 |
| 2003/0019704 A1 | * | 1/2003 | Aoi et al. .................... 188/378 |
| 2003/0057623 A1 | * | 3/2003 | Maeno et al. .............. 267/292 |
| 2003/0062230 A1 | * | 4/2003 | Maeno et al. .............. 188/379 |

FOREIGN PATENT DOCUMENTS

| | | |
|---|---|---|
| JP | 57-52305 | 3/1982 |
| JP | 64-42591 | 3/1989 |
| JP | B2-125878 | 5/1990 |
| JP | 3-86227 | 8/1991 |
| JP | 4-46246 | 4/1992 |
| JP | 9-329182 | 12/1997 |
| WO | WO 00/14429 | 3/2000 |

OTHER PUBLICATIONS

U.S. Application No. 10/102,050 filed on Mar. 19, 2002.
U.S. Application No. 10/076,781 filed on Feb. 13, 2002.

* cited by examiner

*Primary Examiner*—Douglas C. Butler
(74) *Attorney, Agent, or Firm*—Beyer Weaver & Thomas, LLP

(57) ABSTRACT

A vibration-damping device includes a housing member and a pillar-shaped mass member housed within an accommodation space of the housing member with a slight spacing therebetween so that the mass member is freely displaceable within the accommodation space to come into impact on the housing member. A rubber buffer and an abutting rubber member integrally formed with each other and fixed to at least one of axial end portions of the mass member such that the rubber buffer covers an outer circumferential surface of the end portion of the mass member, and the abutting rubber member disposed over an end face of the axial end portion of the mass member. A void is formed between the abutting rubber member and the end portion of the mass member so that the abutting rubber member undergoes shear deformation upon an impact of the mass member on the housing member at the abutting rubber member.

19 Claims, 11 Drawing Sheets

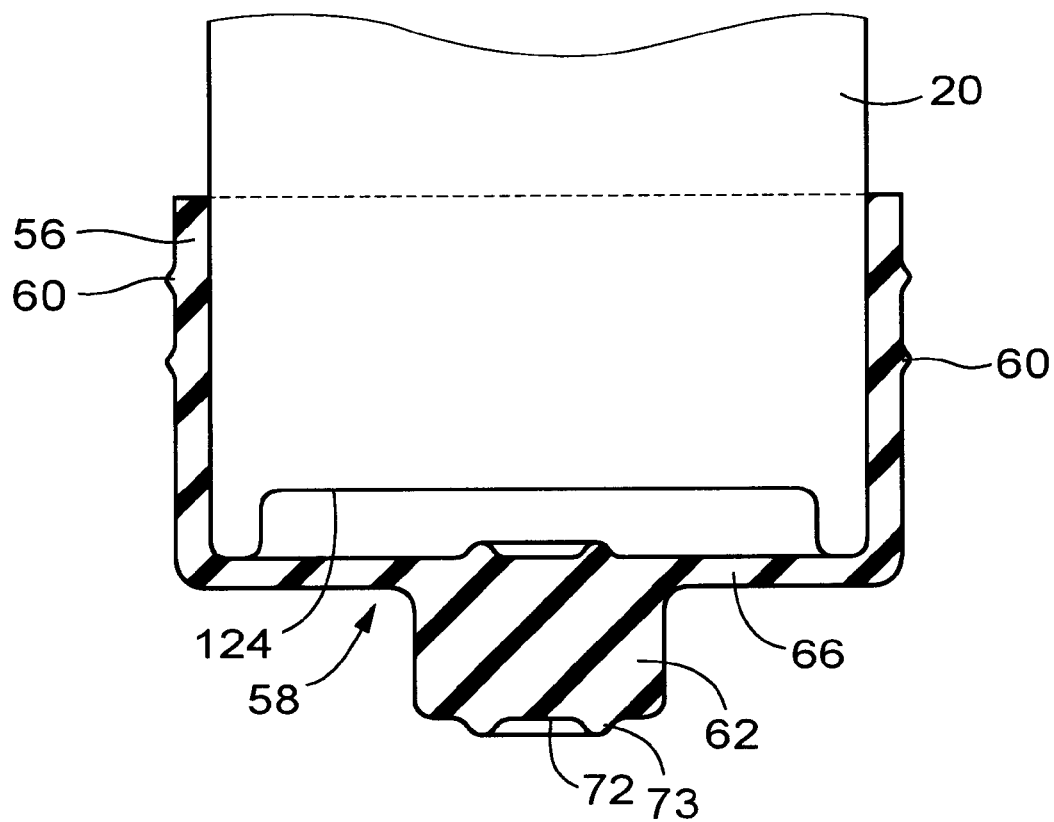

VIBRATION-DAMPING DEVICE

INCORPORATED BY REFERENCE

The disclosure of Japanese Patent Application No. 2001-290574 filed on Sep. 25, 2001 including the specification, drawings and abstract is incorporated herein by reference in its entirety.

BACKGROUND OF THE INVENTION

1. Field of the Invention

The present invention generally relates to vibration-damping devices for use in various kinds of vibrative members, for reducing or attenuating vibrations excited in these vibrative members. More particularly, the present invention is concerned with such a vibration-damping device, which is novel in construction and which is suitably used in an automotive vehicle for damping or attenuating vibrations excited in a suspension member, a sub frame, a body, a mounting bracket, a vibrative member or members used in an engine unit or an exhaustion system, and other vibrative members.

2. Description of the Related Art

Vibration-damping devices have been used in various kinds of vibrative members for damping vibrations excited therein. Known examples of these vibration-damping devices include (a) a mass damper in which a pillar-shaped mass member is fixed to a vibrative member; (b) a dynamic damper in which a pillar-shaped mass member is supported by and connected to the vibrative member via a spring member; and (c) a damping material which is a sheet-shaped elastic member and secured to the vibrative member. However, these conventional devices suffer from various potential problems. For instance, the mass damper and the dynamic damper require a relatively large weight of the pillar-shaped mass member, and exhibit damping effects limited to a considerably narrow frequency range. The damping material requires a relatively large space for its installation, and tends to be large in its weight. In addition, the dynamic damper and the damping material both suffer from difficulty in stably exhibiting desired damping effects thereof, since the damping effects of the dynamic damper and the damping material are prone to vary depending upon the ambient temperature.

The present assignee has been disclosed in International Publication No. WO 00/14429 a novel vibration damper for use in an automotive vehicle, which includes a housing member having an inner space and fixed to the vibrative member, and an independent mass member which is disposed within the inner space of the housing member with a spacing therebetween, without being bonded to the housing member, so that the independent mass member is displaceable or movable relative to the housing member. When vibrations excited in the vibrative member is applied to the vibration damper, the independent mass member and the housing member are brought into elastic impact against each other at their abutting surfaces, thereby exhibiting a vibration damping effect on the basis of loss or dissipation of vibration energy caused by sliding friction generated between the elastic abutting surfaces of the independent mass member and the housing member and caused by collision or impact of the independent mass member on the housing member. This proposed vibration damper is capable of exhibiting a high damping effect over a relatively wide frequency range of input vibrations, while assuring a relatively small weight or mass of the independent mass member.

Extensive studies of the vibration damper disclosed in the International Publication No. WO 00/14429, conducted by the inventors of the present invention, have revealed that the disclosed vibration damper can exhibit such a high damping effect based on a bouncing or jumpily displacement of the mass member relative to the housing member in which the mass member comes into impact on and rebounds from the housing member repeatedly. In order to upgrade the damping effect of the disclosed vibration damper with respect to vibrations excited in the automotive vehicle, namely, vibrations having a relatively low frequency, a relatively small amplitude and a relatively small energy, it is therefore effective to sufficiently decrease a spring stiffness of an elastic body at least partially defining the abutting portion of the mass member, which is adapted to be brought into abutting contact with the housing member, thereby facilitating the jumpily displacement of the mass member relative to the housing member.

To obtain a sufficiently small spring stiffness of the elastic body at least partially defining the abutting portion of the mass member, it may be proposed to arrange the elastic body of the mass member to have a relatively large wall thickness enough to establish a sufficiently small dynamic spring constant of the abutting surface of the mass member, or alternatively, to form the elastic body of the mass member of a soft rubber material. However, in the former case, the wall thickness of the elastic body is likely to be limited by a size of a space for housing the mass member, and in the latter case, the elastic body is likely to be deteriorated in terms of its durability. Therefore, the disclosed vibration damper is less likely to excite the jumpily displacement of the mass member relative to the housing member upon application of such vibrations having the small energy, low frequency and small amplitude, thereby suffering from difficulty in exhibiting a desired vibration damping effect with respect to such vibrations. Thus, the disclosed vibration damper leaves some room for improvement.

SUMMARY OF THE INVENTION

It is therefore one object of this invention to provide an improved vibration-damping device, which makes it possible to reduce a dynamic spring constant at an abutting portion of a mass member with respect to a housing member, without needing an increase of a wall thickness of an elastic body at least partially defining the abutting portion of the mass member and/or the housing member, and without causing deterioration of durability of the elastic body due to a change of a rubber material for forming the elastic body. Therefore, the vibration-damping device is capable of efficiently exciting jumpily displacement of the mass member relative to the housing member, even upon application of vibrations having a small energy, a low frequency and a small amplitude to the vibration-damping device, and accordingly exhibiting an excellent vibration damping effect based on impact of the mass member on the housing member, for these vibrations having the small energy, low frequency and small amplitude.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A vibration-damping device for damping vibrations excited in a vibrative member, comprising: (a) a housing member adapted to be fixed to the vibrative member and defining a accommodation space therein; (b) a pillar-shaped mass member housed within the accommodation space of the housing member with a slight spacing therebetween so that the pillar-shaped mass member is independent of the housing member and is freely displaceable within the accommodation space of the housing member to come into impact on the housing member, the pillar-shaped mass member extending in a primary vibration input direction; and (c) a rubber buffer and an abutting rubber member, which are integrally formed with each other and fixed to at least one of axially opposite end portions of the pillar-shaped mass member such that the rubber buffer covers an outer circumferential surface of the at least one of axially opposite end portions of the pillar-shaped mass member, and the abutting rubber member extends axially outwardly from the rubber buffer so that the abutting rubber member is disposed over an end face of the at least one of axially opposite end portions of the pillar-shaped mass member, and the pillar-shaped mass member comes into impact at a protruding end portion of the abutting rubber member on the housing member, wherein a void is formed between the abutting rubber member and the at least one of axially opposite end portions of the pillar-shaped mass member so that the abutting rubber member undergoes shear deformation upon impact of the pillar-shaped mass member on the housing member at the protruding end portion of the abutting rubber member.

According to this mode of the invention, when the pillar-shaped mass member comes into impact on the housing member via the abutting rubber member in the vibration input direction, the abutting rubber member, which defines an abutting portion of the pillar-shaped mass member with respect to the housing member, undergoes shear deformation. This arrangement makes it possible to reduce or minimize a dynamic spring constant of the abutting portion of the pillar-shaped mass member with respect to the housing member, without needing a significant increase of a wall thickness of the abutting rubber member, or a change of a rubber material for forming the abutting rubber member, which may be required in the case where the rubber abutting member undergoes compression deformation, in order to reduce the dynamic spring constant of the abutting portion of the pillar-shaped mass member. Thus, the vibration-damping device according to this mode of the invention is capable of effectively exciting a bouncing or jumpily displacement of the pillar-shaped mass member relative to the housing member when the vibration-damping device is subjected to vibrations to be damped.

Therefore, the vibration-damping device of this mode of the invention can facilitate the bouncing displacement of the pillar-shaped mass member relative to the housing member, upon application of a vibration having a relatively small energy. For instance, even if an acceleration of the input vibration is not larger than 1 G (a gravity acceleration), the vibration-damping device of this mode of the invention enables the pillar-shaped mass member to bounce off the housing member by reducing the dynamic spring constant of the abutting rubber member, thereby assuring a bouncing displacement of the pillar-shaped mass member relative to the housing member. Thus, the vibration-damping device of this mode of the invention can exhibit a desired damping effect based on the impact (or the abutting contact) of the pillar-shaped mass member on the housing member with respect to the vibrations having a relatively small energy, as well.

According to this mode of the invention, more over, the abutting portion of the pillar-shaped mass member with respect to the housing member is fixedly set to the protruding end portion of the abutting rubber member. This makes it possible to stabilize a position at which the pillar-shaped mass member and the housing member are brought into impact against each other, relative to a center of gravity of the pillar-shaped mass member, even if the pillar-shaped mass member is displaced relative to the housing member in a radial direction perpendicular to an axial direction of the pillar-shaped mass member when performing the bouncing displacement. Therefore, this arrangement allows the vibration-damping device to exhibit the above-mentioned desired damping effect based on the impact of the pillar-shaped mass member on the housing member with high stability.

Preferably, the housing member is formed of iron or other metallic materials having a sufficiently high rigidity so that the vibration damping effect as a result of impact of the pillar-shaped mass member on the housing member is effectively transmitted to the vibrative member. On the other hand, the pillar-shaped mass member is preferably formed of a high gravity material such as iron so as to have a desired mass or weight with a relatively small volume. The shape of the accommodation space defined within the housing member may be desirably determined with a size and a shape of the pillar-shaped mass member taken into consideration, so as to permit a free displacement of the pillar-shaped mass member in the vibration input direction, while limiting undesirable or unnecessary displacement of the pillar-shaped mass member, e.g., a slant or a side travel or slip.

The pillar-shaped mass member may have a variety configurations so long as at least one of axially opposite end portions of the pillar-shaped mass member is provided with the abutting rubber member so as to form the abutting portion of the pillar-shaped mass member with respect to the housing member. For instance, a solid cylindrical member having a circular or polygonal shape in its transverse cross section may be preferably employed as the pillar-shaped mass member. Preferably, the pillar-shaped mass member comes into impact on the housing member at both of axially opposite sides thereof, thereby exhibiting a desired damping effect with further improved efficiency. If the vibration input direction extends in the vertical direction, the abutting portion may be provided only for an axially lower end portion of the pillar-shaped mass member.

The rubber buffer may be desirably formed so long as it is formed on an outer circumferential surface of at least one of axially opposite end portions of the pillar-shaped mass member. For instance, the rubber buffer may be formed on the entire area of the outer circumferential surface of the pillar-shaped mass member, or alternatively may include a lip-shaped projection integrally formed on and protruding from the outer circumferential surface of the rubber buffer, which extends in a desired direction, e.g., the circumferential direction or the axial direction. When the rubber buffer is formed on the outer circumferential surface of the at least one of axially opposite end portions of the pillar-shaped mass member, the outer diameter of the at least one of axially opposite end portions of the pillar-shaped mass member is made smaller by a given radial dimension for permitting the rubber buffer to have a desired wall thickness, while avoiding enlargement of the outer diameter of the pillar-shaped mass member, thereby providing the vibration-damping device which is made compact in size.

The rubber buffer and the abutting rubber member may be formed by vulcanizing a suitable rubber material in a mold cavity designed for forming the rubber buffer and the abutting rubber member, wherein the pillar-shaped mass member is disposed in position, so that the rubber buffer and the abutting rubber member are bonded to the pillar-shaped mass member at the time of the vulcanization of the rubber material, thereby providing an integrally vulcanized product consisting of the pillar-shaped mass member, the rubber buffer and the abutting rubber member. Alternatively, the rubber buffer and the abutting rubber member may be formed independent of the pillar-shaped mass member in advance, and then are fixed to the pillar-shaped mass member.

(2) A vibration-damping device according to the above indicated mode (1), wherein the rubber buffer and the abutting rubber member are integrally formed with each other to form an end rubber member, which is independent of the pillar-shaped mass member, and is firmly assembled by press fitting onto the at least one of axially opposite end portions of the pillar-shaped mass member. According to this mode of the invention, a cumbersome adhesive treatment is no longer needed upon forming the rubber buffer and the abutting rubber member. This simplifies the process of manufacturing the vibration-damping device, and makes it possible to form the void located between the abutting rubber member and the at least one of axially opposite end portions of the pillar-shaped mass member with ease in a desirable form. This arrangement also provides the vibration-damping device with an option to tune its damping characteristics by suitably selecting a combination of the pillar-shaped mass member and the end rubber member from among pillar-shaped mass members having different masses and end rubber members having different spring characteristics.

(3) A vibration-damping device according to the above indicated mode (1) or (2), wherein a principal elastic axis of the abutting rubber member is arranged to extend through a center of gravity of the pillar-shaped mass member, and the abutting rubber member has an abutting surface to be brought into abutting contact with the housing member, which is defined by a plane extending in a direction perpendicular to the principal elastic axis of the abutting rubber member. The vibration-damping device according to this mode of the invention is able to stabilize the elastic deformation of the abutting rubber member upon impact of the pillar-shaped mass member on the housing member, thereby stabilizing the jumpily displacement of the pillar-shaped mass member and a resultant damping effect. It should be appreciated that the abutting surface may be formed as a single form, or alternatively may be divided into a plurality of segments.

(4) A vibration-damping device according to any one of the above-indicated modes (1)–(3), wherein the housing member includes a plane surface which is opposed to the abutting rubber member, and which extends in a radial direction perpendicular to a central axis of the pillar-shaped mass member over an area larger than an abutting area to which the abutting rubber member is brought into abutting contact with the housing member. According to this mode of the invention, even if the pillar-shaped mass member shifts its position in the horizontal direction on the plane surface during its jumpily displacement, the pillar-shaped mass member can be brought into impact on the housing member with the substantially same abutting condition, making it possible to stabilize the damping effect of the vibration-damping device based on the impact of the pillar-shaped mass member on the housing member.

(5) A vibration-damping device according to any one of the above-indicated modes (1)–(4), wherein the abutting rubber member is formed with a through hole through which the void is exposed to the accommodation space. This arrangement can avoid that the closed void functions as an air spring when the abutting rubber member is elastically deformed, further effectively assuring the low dynamic spring constant of the abutting rubber member, while stabilizing the spring characteristics of the abutting rubber member and the damping effect of the vibration-damping device based on the jumpily displacement of the pillar-shaped mass member.

(6) A vibration-damping device according to any one of the above-indicated modes (1)–(5), further comprising a cushioning projection formed at a portion of an inner surface of the abutting rubber member defining the void, so as to be opposed to and protrude toward the pillar-shaped mass member, in a direction of a central axis of the pillar-shaped mass member. The cushioning projection functions to absorb or attenuate impact or noises when an excessively large vibration energy acts on the abutting rubber member, and whereby the abutting rubber member is brought into abutting contact with the pillar-shaped mass member due to a large elastic deformation of the elastic support member and the abutting rubber buffer enough to vanish the void.

(7) A vibration-damping device according to any one of the above-indicated modes (1)–(6), wherein the abutting rubber member is formed by using a mold whose parting line is arranged to be spaced away from a molding surface for forming an abutting surface to be brought into abutting contact with the housing member. While a surface or a dimensional accuracy of the abutting surface is an important factor to stabilize the damping effect of the vibration-damping device, this arrangement makes it possible to ensure a high surface or dimensional accuracy of the abutting surface with ease, without needing additional treatment e.g., an elimination of burrs. In order to arrange the parting line of the mold to be spaced away from the molding surface of the abutting surface of the abutting rubber member, at least the protruding end portion of the abutting rubber member may be formed by using a generally cup shaped mold consisting of mold halves moved to each other in the axial direction of the abutting rubber member to close the mold.

(8) A vibration-damping device according to any one of the above-indicated modes (1)–(7), wherein the accommodation space defined within the housing member is fluid-tightly closed from an external area. This arrangement can avoid undesirable entrance of the dust or other foreign substances into the accommodation space defined by the housing, thereby effectively preventing deterioration or insecurity of the vibration damping effects. Thus, the vibration-damping device can assure an improved reliability and stability in its damping capability.

(9) A vibration-damping device according to any one of the above-indicated modes (1)–(8), wherein the abutting rubber member includes: a block-shaped abutting part disposed in a coaxial relationship with the pillar-shaped mass member and located axially outward of the at least one of axially opposite end portions of the pillar-shaped mass member with a spacing therebetween, the block-shaped abutting part being brought into abutting contact with the housing member at an abutting surface thereof, which is smaller than the end face of the at least one of axially opposite end portions of the pillar-shaped mass member; and an elastic support part extending axially outwardly and radially outwardly from an outer peripheral portion of the abutting part toward an outer peripheral portion of the at least one of axially opposite end portions of the pillar-shaped mass member so as to elastically connect the abutting part to the pillar-shaped mass member, such that a principal elastic axis of the elastic support part extends along with a central axis of the pillar-shaped mass member, and the elastic support part is subjected to shear deformation upon impact of pillar-shaped mass member on the housing member at the abutting surface of the abutting part of the abutting rubber member. This vibration-damping device according to this mode of the invention effectively permits the abutting rubber member to come into abutting contact with the housing member with a stable condition, while ensuring a low dynamic spring constant of the abutting rubber member as a result of the shear deformation of the elastic support part. Further, the vibration-damping device according to this mode of the invention ensures the shear deformation of the abutting rubber member when coming into abutting contact with the housing member, while providing the plane surface extending in the radial direction on the axially opposite end faces of the pillar-shaped mass member. Therefore, the use of the pillar-shaped mass member whose axially opposite end faces are made plane makes it facilitate further the manufacture of the desired vibration-damping device of the invention.

Preferably, the block-shaped abutting part has a solid cylindrical block shape with a diameter sufficiently smaller than that of the pillar-shaped mass member, while being disposed in a coaxial relationship with the pillar-shaped mass member. This arrangement enables the abutting rubber member to come into abutting contact with the housing member under a further stabilized condition. Preferably, the elastic support part is formed in a tapered shape extending radially outwardly and axially outwardly from the abutting part to the outer peripheral portion of the pillar-shaped mass member. Alternatively, the elastic support part consists of a plurality of rib-shaped support members, which are substantially spaced away from each other in a circumferential direction, and which extend straightly with a given gradient from the abutting part to the outer peripheral portion of the pillar-shaped mass member. Also, one of axially opposite end portions of the elastic support part, which is located on the side of the pillar-shaped mass member, is superposed on and assembled with an outer peripheral portion of the end face of the at least one of axially opposite end portion of the pillar-shaped mass member, preferably. This arrangement may stabilize the elastic deformation of the elastic support part against a load applied thereto in a direction in which the principal elastic axis of the abutting part extends, resulting in an improved anti-load capability of the elastic support part of the abutting rubber member.

The vibration-damping device constructed according to any one of the above-indicated modes (1)–(9), may be installed on the vibrative member, according to a variety of arrangements. For example, the vibration-damping device of the invention may be installed on the vibrative member such that the housing member is fixedly mounted on the vibrative member so that vibrations excited in the vibrative member is directly applied to the housing member. Alternatively, the vibration-damping device may be installed on the vibrative member such that the housing member is mounted on the vibrative member via a suitable spring member so that the vibrations excited in the vibrative member is indirectly applied to the housing member via the spring member. In the former case, the housing member can be directly fixed to the vibrative member with ease. With the housing member fixed to the vibrative member, active damping effect based on the impact of the pillar-shaped mass member on the housing member can directly affect on the vibrative member. In the latter case, on the other hand, the vibration-damping device mounted on the vibrative member via the spring member constitutes a secondary vibration system for the vibrative member as a primary vibration system. Namely, the pillar-shaped mass member and the housing member cooperate to function as a mass system, while the spring member functions as a spring system in the secondary vibration system. That is, the vibration-damping device installed on the vibrative member via the spring member functions as a dynamic damper, as well. In the latter case, particularly, the vibration-damping device itself functions as the mass system in the secondary vibration system or the dynamic damper, so that a suitable tuning of a natural frequency of the secondary vibration system for a frequency range of vibrations to be damped permits an efficient transmission of the vibrations excited in the vibrative member to the vibration-damping device, thereby actively exciting jumpily displacement of the pillar-shaped mass member within the housing member. Thus, the vibration-damping device mounted on the vibrative member via the spring member can effectively exhibit an excellent damping effect with respect to the vibrations excited in the vibrative member, even if the excited vibrations have relatively small vibration energy.

In the vibration-damping device constructed according to any one of the above-indicated modes (1)–(9), the pillar-shaped mass member is preferably arranged to have a mass within a range of 10–1000 g, more preferably 50–500 g. Namely, the pillar-shaped mass member having the mass of 1000 g or smaller, more preferably 500 g or smaller, is likely to be displaced upon application of vibrational loads to the housing member, making it possible to excite the jumpily displacement of the pillar-shaped mass member more easily and efficiently. Also, the pillar-shaped mass member having the mass of 10 g or larger more preferably 50 g or larger, ensures the vibration-damping device to exhibit an excellent damping effect based on the impact of the pillar-shaped mass member on the housing member.

The vibration-damping device according to any one of the above-indicated modes (1)–(9), may preferably be modified such that the rubber buffer covering the outer circumferential surface of the pillar-shaped mass member is opposed to an inner surface of the housing member in a diametrically opposite sides thereof with a spacing therebetween so that the pillar-shaped mass member is able to travel by a distance of 0.1–1.6 mm, more preferably 0.1–1.0 mm, in a diametric direction. This arrangement makes it possible to minimize an amount of inclination or tilt of the central axis of the pillar-shaped mass member during its jumpily displacement, thus further stabilizing condition upon impact of the pillar-shaped mass member on the housing member.

Preferably, the pillar-shaped mass member is brought into impact at its both sides, which are opposed to each other in the vibration input direction, on respective abutting surfaces of the housing member which are opposed to each other with the pillar-shaped mass member interposed therebetween in the vibration input direction. In particular, a travel distance of the pillar-shaped mass member between the abutting surfaces of the housing member is determined within a range of 0.1–1.6 mm, more preferably 0.1–1.0 mm. Since the gap distance between the pillar-shaped mass member and the housing member is held within the above-described slight dimension, the pillar-shaped mass member is more likely to come into impact on the housing member at its opposite sides in the vibration input direction, even if input vibrations has a relatively small amplitude like vibrations excited in an automotive vehicle, whereby the vibration-damping device of the invention can exhibit an excellent damping effect with respect to the vibrations excited in the automotive vehicle. Particularly, it is very important to make sure the impact of the pillar-shaped mass member on the housing member on the opposite sides of the pillar-shaped mass member in the vibration input direction for ensuring the jumpily displacement of the pillar-shaped mass member, when the vibration-damping device is subjected to vibrations primarily applied thereto in the horizontal direction.

In order to reduce impact noises upon impact of the pillar-shaped mass member on the housing member, the abutting rubber member forming the abutting portion of the pillar-shaped mass member with respect to the housing member, may preferably have a Shore D hardness of 80 or lower, more preferably, within a range of 20–40, as measured in accordance with ASTM method D-2240, while having a modulus of elasticity within a range of $1–10^4$ MPa, more preferably, $1–10^3$ MPa, and a loss tangent is not less than $10^{-3}$, more preferably within a range of 0.01–10.

Preferably, the vibration-damping device according to the present invention may be modified such that a total mass of the pillar-shaped mass member is held within a range of 5–15%, more preferably 5–10% of a mass of the vibrative member. Namely, if the mass of the pillar-shaped mass member is made smaller than 5% of the mass of the vibrative member, the vibration-damping device possibly suffers from difficulty in exhibiting a desired damping effect, and if the mass of the pillar-shaped mass member is larger than 15% of the mass of the vibrative member, the vibration-damping device suffers from a problem of increase in the overall weight of the device. In the case where a plurality of vibration-damping devices are mounted on the vibrative member, or a plurality of mass members are housed in the housing member, the total mass of the plurality of pillar-shaped mass members is desirably arranged to be held within a range of 5–15% of the mass of the vibrative member.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein:

FIG. 13 is an axial or vertical cross sectional view of yet another example of the lower cushioning cover of the vibration-damping device of FIG. 1.

DETAILED DESCRIPTION OF PREFERRED EMBODIMENTS

Figure 1:
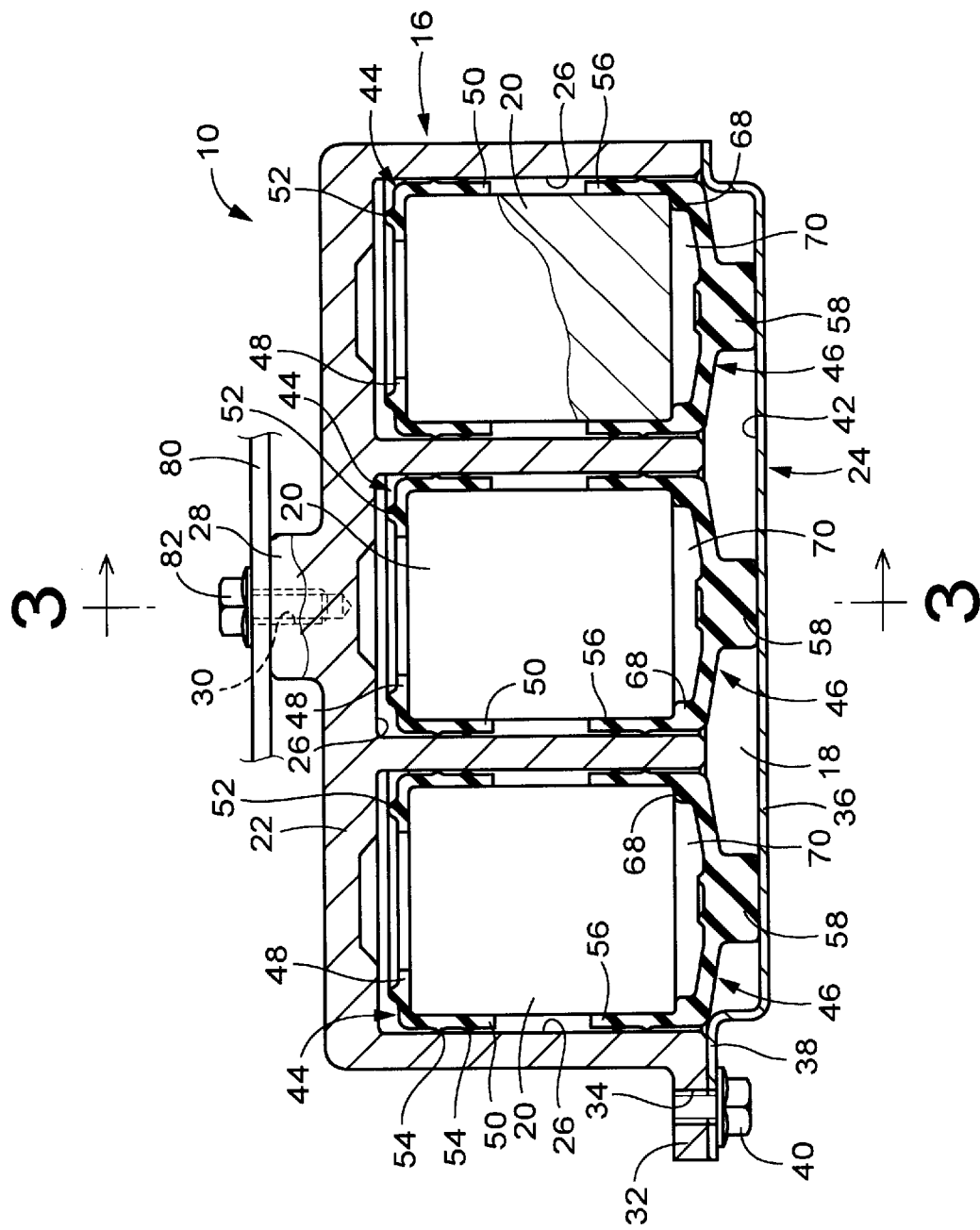
FIG. 1 is an elevational view in vertical or axial cross section of a vibration-damping device constructed according to a first embodiment of the invention, which is taken along line 1—1 of FIG. 2.
Figure 2:
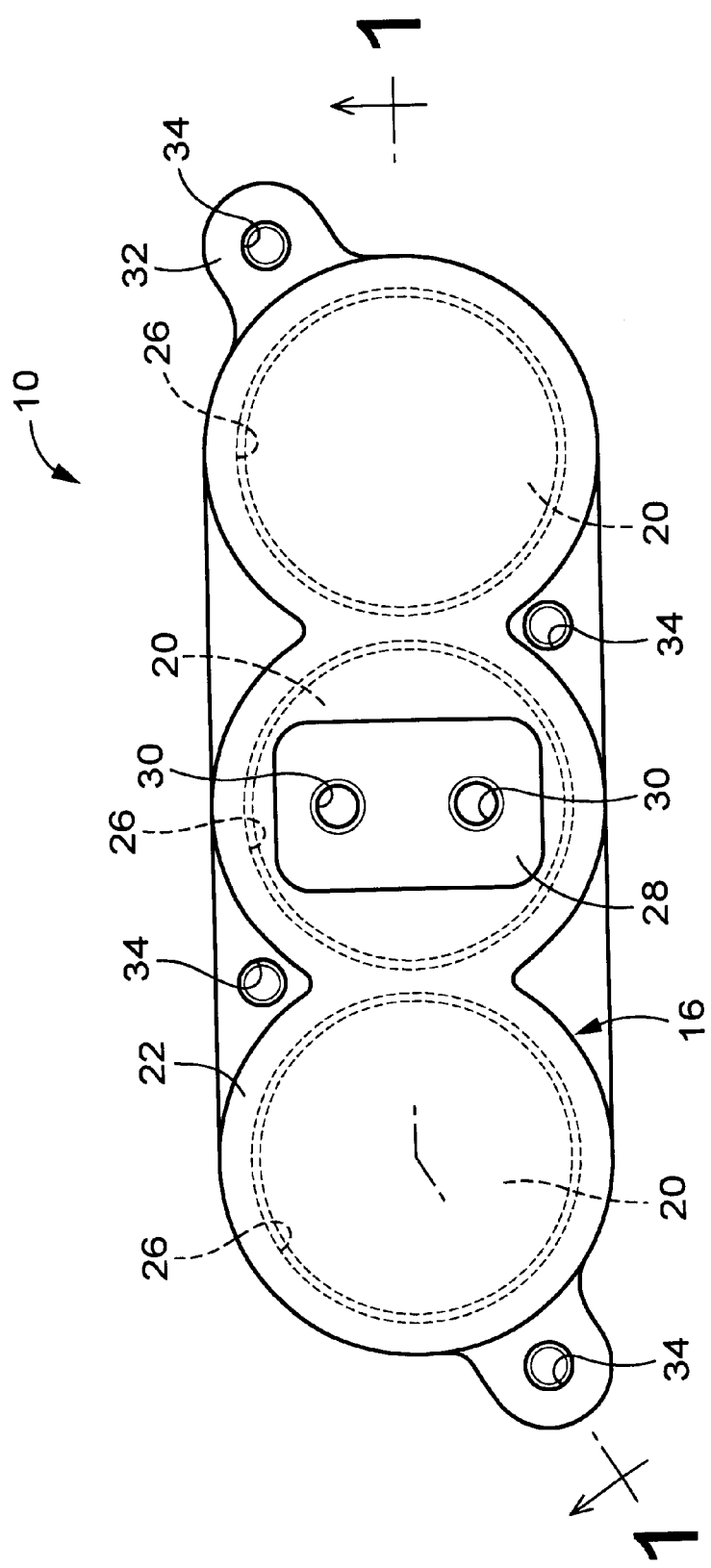
FIG. 2 is a top plane view of the vibration-damping device of FIG. 1.
Figure 3:
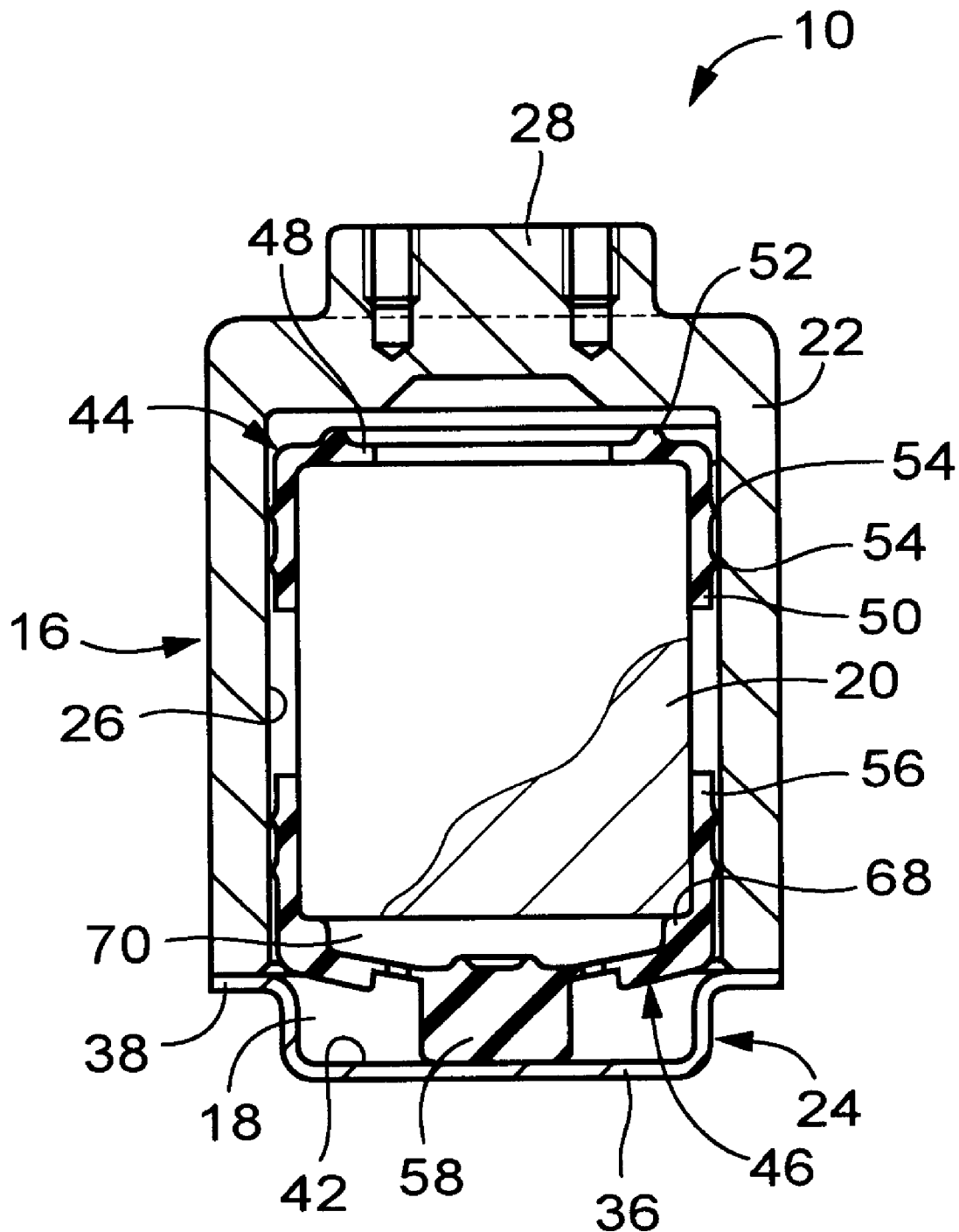
FIG. 3 is a cross sectional view taken along line 3—3 of FIG. 1.

Referring first to FIGS. 1–3, there is shown a vibration-damping device 10 constructed according to a first embodiment of the present invention. The vibration-damping device 10 includes a hollow housing member 16 defining an accommodation space 18 therein, and a plurality of mass members 20 housed within the accommodation space 18. This vibration-damping device 10 is directly fixed by means of bolts, or the like to a vibrative member such as a body of an automotive vehicle (not shown), so as to receive a vibrational load primarily in the vertical direction as seen in FIG. 1, which is approximately equal to the vertical direction. There will be described in detail the engine mount 10 basically referring to the vertical direction as seen in FIG. 1.

The hollow housing member 16 includes a housing body 22 and a lower lid 24. The housing body 22 is a generally inverted-cup shaped member, wherein three inverted cylindrical cup members are arranged in series with their axes extending parallel to one another, and bonded together by integrating adjacent walls thereof. That is, the hollow housing member 16 has three recesses 26 arranged in series, each extending in the vertical direction with a constant circular cross sectional shape, and each being open in an axially lower end face of the housing body 22.

The housing body 22 includes a support projection 28 that is integrally formed at a central portion of an upper wall of the housing body 22 so as to protrude axially upwardly as seen in FIG. 1, for fixing the housing body 22 to the vibrative member. The support projection 28 is formed with a tapped hole 30 for receiving a mounting bolt 82 (which will be described later). Furthermore, a plurality of fixing plates 32 are integrally formed at respective portions of an outer circumference of an axially lower end portion of the housing body 22, so as to extend in a radially outward direction perpendicular to axial directions of the three recesses 26. A screw hole 34 is formed through each of the fixing plates 32 for fixing the lower lid 24 (which will be described later) to the axially lower end face of the hollow housing member 16.

The housing body 22 may be formed of a metallic material or other materials having a sufficient rigidity and strength so as not to be deformed by impact thereof on a mass member 20 (which will be described later). For instance, the housing body 22 may be formed of cast iron, in the light of an efficiency and a cost of manufacture of the housing body 22. To ensure a high dimensional accuracy of each of the three recesses 26 of the housing body 22, an inner circumferential surface and a bottom surface of each of the three recesses 26 is desirably finished, e.g., cutting.

Likewise, the lower lid 24 may be formed of a metallic material or other materials having a sufficient rigidity and strength so as not to be deformed by the impact thereof with the mass member 20 (which will be described later). For instance, the lower lid 24 may be formed of ferrous metal by pressing, in the light of an efficiency and a cost of manufacture of the lower lid 24. The lower lid 24 has a shallow dish-like shape in its entirety, and includes a central recessed portion 36 and an outward flange portion 38 integrally formed at a peripheral portion of an opening of the central recessed portion 36. The central recessed portion 36 is shaped to generally conform to a shape of the lower surface of the housing body 22, for extending across and covering all openings of the three recesses 26 of the housing body 22.

The lower lid 24 is laminated onto the lower surface of the housing body 22 with its outward flange portion 38 being held in contact with an outer peripheral portion of the lower surface of the housing body 22. In this state, the outward flange portion 38 of the lower lid 24 is bolted to the fixing plates 32 of the housing body 22, whereby the lower lid 24 is fixed to the housing body 22. As a result, the openings of the three recesses 26 of the housing body 22 are entirely closed by the central recessed portion 36 of the lower lid 24. It is noted that a bottom surface 42 of the central recessed portion 36, which is opposed to the openings of the three recesses 26, extends horizontally and is made flat over its approximately entire area.

Namely, the lower lid 24 is fixed to the lower end face of the housing body 22 as described above, and the openings of the three recesses 26 of the housing body 22 is closed by the lower lid 24, whereby the hollow housing member 16 is provided. The thus formed hollow housing member 16 includes therein the accommodation space 18 that is defined by the vertically extending three recesses 26 and the central recessed portion 36 with which the three recesses 26 are connected one another at their lower end portions. Since the outer peripheral portion of the lower end face of the housing body 22 is held in close contact with the outward flange portion 38 of the lower lid 24, the accommodation space 18 is isolated from the external area.

The accommodation space 18 houses three pillar-shaped mass members 20 disposed in three recesses 26, respectively. Each of the mass members 20 is a solid cylindrical block member made of iron or other metallic materials having higher gravities. Each mass member 20 has an outer diameter, i.e., a diameter of a circular cross section, which is made slightly smaller than an inner diameter of the corresponding recess 26 of the housing member, and also has an axial dimension that is slightly smaller than a depth dimension of the corresponding recess 26.

Hereinafter, one of the three mass members 20 will be described in detail, since the three mass members 20 are identical with each other in terms of structure. An upper cushioning cover 44 and a lower cushioning cover 46 functioning as an end rubber member are fitted onto axially upper and lower end portions of the mass member 20. The upper cushioning cover 44 includes an annular plate-like upper wall portion 48 and a cylindrical portion 50 integrally formed at a periphery of the upper wall portion 48 so as to extend axially downwardly. Namely, the upper cushioning cover 44 is shaped as a solid of revolution, which extending circumferentially with a constant cross section of a thin inverted "L" shape. The upper cushioning cover 44 is an integral rubber elastic body member, and is dimensioned such that an inner diameter of the cylindrical portion 50 is made slightly smaller than the outer diameter of the corresponding mass member 20. The upper cushioning cover 44 is further provided with annular rib-like projections 52, 54, 54. Described in detail, the annular rib-like projection 52 is integrally formed at a radially intermediate portion of an upper surface of the upper wall portion 48 so as to extend circumferentially and protrude axially outwardly. The annular rib-like projections 54, 54, on the other hand, are integrally formed at respective axially intermediate portions of an outer circumferential surface of the cylindrical portion 50 so as to extend circumferentially and protrude radially outwardly.

The upper cushioning cover 44 constructed as described above is formed independent of the mass member 20, and press-fitted onto the axially upper end portion of the mass member 20, which may be subjected to an adhesive treatment, as needed. In this state, the upper wall portion 48 of the upper cushioning cover 44 is held in close contact with the axially upper end face of the mass member 20, while the cylindrical portion 50 of the upper cushioning cover 44 is held in close contact with the outer circumferential surface of the axially upper end portion of the mass member 20. As a result, the upper cushioning cover 44 covers entirely a circumferential edge formed in the axially upper end portion of the mass member 20.

Figure 4:
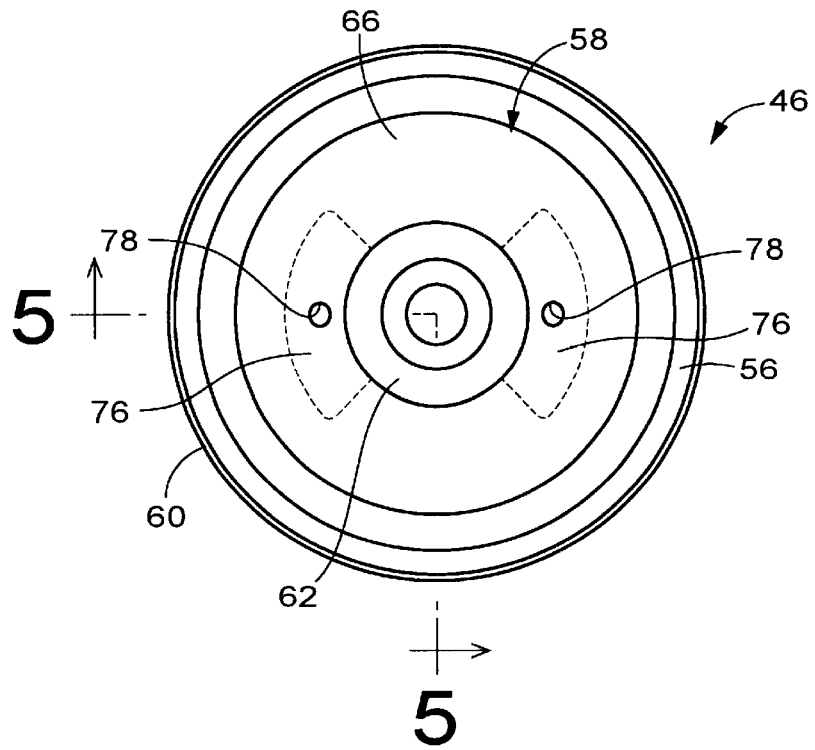
FIG. 4 is a plane view illustrating a lower cushioning cover of the vibration-damping device of FIG. 1.
Figure 5:
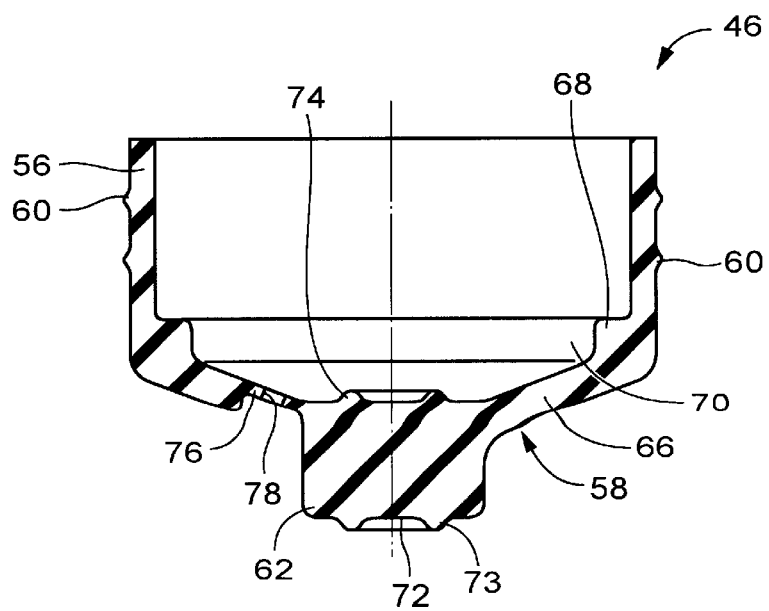
FIG. 5 is a cross sectional view taken along line 5—5 of FIG. 4.

FIGS. 4 and 5 show the lower cushioning cover 46 that includes a cylindrical portion 56 functioning as a rubber buffer and a bottom wall portion 58 integrally formed at an axially lower part of the cylindrical portion 56. That is, the lower cushioning cover 46 is an integral rubber elastic body member having a generally cylindrical cup shape in its entirety. The cylindrical portion 50 has an inner diameter that is made slightly smaller than the outer diameter of the mass member 20. Annular rib-like projections 60, 60 are formed at respective axially intermediate portions of an outer circumferential surface of the cylindrical portion 50 so as to extend circumferentially and protrude radially outwardly.

The bottom wall portion 58 of the lower cushioning cover 46 includes a central block-shaped abutting part 62 and a peripheral elastic support part 66, which are integrally formed with each other. The abutting part 62 is a block like member extending axially outwardly or downwardly as seen in FIG. 4, with a generally constant circular cross sectional shape. The elastic support part 66 extends radially outwardly and axially upwardly from an axially upper peripheral portion of the abutting part 62 so that the elastic support part 66 has a tapered or a funnel-like shape with a given gradient. The elastic support part 66 is integrally connected at its outer peripheral portion to a peripheral portion of an axially lower end portion of the cylindrical portion 56.

The lower cushioning cover 46 constructed as described above is formed independent of the upper cushioning cover 44 as well as the mass member 20, and is press-fitted onto the axially lower end portion of the mass member 20, which may be subjected to an adhesive treatment, as needed. In this state, the cylindrical portion 56 of the lower cushioning cover 46 is held in close contact with an outer circumferential surface of the axially lower end portion of the mass member 20, while the elastic support part 66 of the bottom wall portion 58 of the lower cushioning cover 46 protrudes axially downwardly from and is disposed on an axially lower end face of the mass member 20 with a spacing therebetween. As a result, the lower cushioning cover 46 covers entirely the axially lower end portion of the mass member 20, including the lower end face of the mass member 20.

The lower cushioning cover 46 further includes a support projection 68 integrally formed at a conjunction between the outer peripheral portion of the elastic support part 66 and the lower end portion of the cylindrical portion 56, so as to extend radially inwardly by a given radial distance, while extending circumferentially over an entire circumference of the conjunction. This support projection 68 is adapted to support a peripheral portion of the lower end face of the mass member 20, which is held in abutting contact with the support projection 68, whereby the outer circumferential portion of the elastic support port 66 is held in contact with the peripheral portion of the lower end face of the mass member 20 for elastically supporting the mass member 20. With the lower cushioning cover 46 mounted on the axially lower end portion of the mass member 20 as described above, the elastic support part 66 and the abutting part 62 are substantially entirely disposed on the axially lower side of the lower end face of the mass member 20 with a given spacing therebetween. That is, the elastic support part 66 and the abutting part 62 of the lower cushioning cover 46 cooperate with the mass member 20 to define therebetween a void 70 that permits an axial displacement of the abutting part 62 as a result of elastic deformation of the elastic support part 66.

The abutting part 62 of the lower cushioning cover 46 is disposed coaxially with the mass member 20, and has an abutting surface 72 with a circular shape extending in a radial direction perpendicular to an axis thereof. As is apparent from FIG. 5, a rib-like projection 73 is integrally formed on the abutting surface 72 so as to extend circumferentially about the axis of the abutting part 62. The provision of the rib-like projection 73 permits an adjustment of an initial spring characteristics of the abutting surface 72 during impact thereof on the lower lid 24 of the hollow housing member 16, and an elimination or reduction of undesirable impact noises. Further, a rib-like projection 74 functioning as a cushioning projection is integrally formed on an axially upper end face of the abutting part 62 so as to extend circumferentially about the axis of the abutting part 62, while extending axially upwardly toward the axially lower end face of the mass member 20 in the void 70. When the elastic support part 66 is excessively deformed, the abutting part 62 is brought into abutting contact with the lower end face of the mass member 20 via the rib-like projection 74, whereby the provision of the rib-like projection 74 can eliminate or moderate undesirable impact noises occurred upon impact of the mass member 20 and the abutting part 62. Preferably, the abutting surface 72 of the abutting part 62, where the rib-like projection 73 is formed, is arranged to have a Shore D hardness of not greater than 80 as measured in accordance with ASTM method D-2240, a modulus of elasticity within a range of $1-10^4$ MPa, and a loss tangent not less than $10^{-3}$.

In order to adjust spring characteristics of the elastic support part 66, a pair of thin-walled portion 76, 76 are formed in respective circumferential portions of the elastic support part 66, which portions are opposed to each other in a diametric direction of the abutting part 62 with the abutting part 62 interposed therebetween. Each of the thin-walled portion 76 extends circumferentially by a circumferential length that is approximately equal to a quarter of an entire circumference of the elastic support part 66 with a given width dimension. The thin-walled portions 76, 76 are formed at their central portions with through holes 78, 78, respectively, whereby an inner side of the void 70 is exposed to the external area through these through holes 78, 78.

Any conventional methods may be employed for forming the lower cushioning cover 46 constructed as described above. In general, the lower cushioning cover 46 may be formed by injecting and vulcanizing a given rubber material into a mold cavity defined within a mold, whose profile corresponds to that of the lower cushioning cover 46. In this case, the mold may preferably consist of at least two segments, which are butted together at a parting line perpendicular to the axial direction of the lower cushioning cover 46, and at least an outer circumferential surface and an axially lower end face (i.e., the abutting surface 72) of the abutting part 62 may preferably be defined by a molding surface of a single segment of the mold so that the parting line is not located on or near the abutting surface 72. More preferably, each of the upper and lower cushioning covers 44, 46 is formed by using a mold cavity consisting of at least two segments, which are butted together at a parting line perpendicular to the axial direction of the upper or lower cushioning cover 44, 46 so that the parting line is positioned to be away from the outer circumferential surface or the axially end face of the upper or lower cushioning cover 44, 46, which are opposed to an inner surface of the hollow housing member 16 that defines the accommodation space 18. This arrangement makes it possible to stably provide a slight clearance between the mass member 20 and the inner surface of the accommodation space 18, permitting a further stabilized abutting condition upon impact between the mass member 20 and the hollow housing member 16, and a further stabilized jumpily displacement of the mass member 20.

The three mass members 20, each being equipped with the upper and the lower cushioning covers 44, 46 as described above, are housed within the accommodation space 18 of the hollow housing member 16 such that these three mass member 20 are disposed in the three recesses 26 of the housing body 22, respectively. In this state, each mass member 20 is axially movable back and force, or is axially jumpily displaceable within the accommodation space 18, while being independent of the hollow housing member 16.

The vibration-damping device 10 constructed as described above is mounted on a vibrative member in the form of a body panel 80 of the automotive vehicle such that the support projection 28 of the hollow housing member 16 is superposed onto and fixed to the body panel 80 by means of mounting bolts 82, 82 screwed into the tapped holes 30, 30. In this state, when the vibrations to be damped, which are excited in the body panel 80, are applied to the vibration-damping device 10 primarily in the vertical direction, as described above, each mass member 20 is forced to move reciprocately in the vertical direction within the accommodation space 18, relative to the hollow housing member 16. That is, the each mass member 20 is brought into impact on and jumped off the hollow housing member 16 repeatedly as a result of the axially reciprocate displacement of the mass member 20 relative to the hollow housing member 16. This vibration-damping device 10 is capable of exhibiting an excellent vibration damping effect based on load effects caused by the impact of the mass member 20 on the hollow housing member 16.

It should be appreciated regarding the vibration-damping device 10 of this embodiment that the abutting part 62 defining the abutting surface 72 of each mass member 20 with respect to the hollow housing member 16 is elastically connected to the mass member 20 via the elastic support part 66 with the tapered or funnel shape, so that the elastic support part 66 is primarily subjected to shear deformation when the mass member 20 comes into impact on the hollow housing member 16. This arrangement permits the vibration-damping device 10 to surely exhibit a low dynamic spring constant at the abutting part 62 of the mass member 20 For this reason, even if the input vibration has a small energy, a low frequency and a small amplitude, like vibrations excited in the vehicle, an oscillating or vibrative force effectively acts on the mass member 20 with the help of an elastic deformation of the elastic support part 66, resulting in effective oscillation or displacement of the mass member 20. Therefore, the vibration-damping device 10 can efficiently excite the jumpily displacement of the mass member 20 relative to the hollow housing member 16, making it possible to exhibit a desired damping effect in a further effective manner.

Further, the elastic support part 66 and the abutting part 62, which cooperate to form the abutting portion of the mass member 20, is firmly fixed to the mass member 20, preventing that an abutting center of the abutting part 62 undesirably deviates or offsets from its desired position with respect to a center of gravity of the mass member 20. This arrangement allows the mass member 20 to be brought into impact on the hollow housing member 16 with a stabilized condition as measured at its abutting portion, further stabilizing the damping effect of the vibration-damping device 10 based on the impact of the mass member 20 on the hollow housing member 16.

According to the vibration-damping device 10 of the present embodiment, yet further, the lower cushioning cover 46 consisting of the elastic support part 66 and the abutting part 62, is formed independently of the mass member 20, and then is fixed to the mass member 20 after the formation thereof. This eliminates a need for an adhesive treatment performed on the mass member 20 upon the formation of the lower cushioning cover 46, making it possible to manufacture the lower cushioning cover 46 with ease.

In the present embodiment, the largest diameters of the upper and the lower cushioning covers 44, 46, namely, an outer diameter of the rib-like projection 54 formed on the cylindrical portion 50 of the upper cushioning cover 44 and an outer diameter of the rib-like projection 60 formed on the cylindrical portion 56 of the lower cushioning cover 46 are made smaller by 0.1–1.6 mm than the inner diameter of the recess 26 of the housing body 22. On the other hand, the largest axial dimension of the mass member 20, i.e., the dimension between a protruding end portion of the rib-like projection 52 formed on the upper wall portion 48 of the upper cushioning cover 44 and the abutting surface 72 of the abutting part 62 of the lower cushioning cover 46, is made smaller by 1.0 mm or more, more preferably by 1.0–3.0 mm, than an axial distance between the upper wall surface of the recess 26 of the housing member 22 and the bottom surface 42 of the lower lid 24. In this respect, the "largest axial dimension" of the mass member 20 should be interpreted to mean the axial dimension of the mass member 20 that is measured in a static state where the mass member 20 is statically placed on the bottom surface 42 of the lower lid 24 with the lower cushioning cover 46 is elastically deformed or compressed by a given amount due to the gravity acting on the mass member 20.

Namely, an excessively small radial gap distance between each mass member 20 and the corresponding recess 26 is likely to cause undesirable friction or contact between the mass member 20 and the recess 26 when vibrational loads are applied to the vibration-damping device 10. This undesirably restricts axial displacement of the mass member 20 relative to the housing member 16, making it difficult for the vibration-damping device 10 to exhibit a damping effect on the basis of impact of the mass member 20 on the housing member 16 caused by the axial displacement of the mass member 20 relative to the housing member 16. On the other hand, an excessively large radial gap distance between each mass member 20 and the corresponding recess 26 is likely to cause irregular displacement of the mass member 20, e.g., a tilt of the mass member 20, making it difficult for the vibration-damping device 10 to exhibit a desired damping effect with stability. Meanwhile, the axial dimension of the accommodation space 18 may be determined so as to permit a substantially independent axial displacement of the mass member 20 relative to the hollow housing member 16.

In order to permit the mass member 20 to bound off completely, namely to be completely spaced away from the bottom surface 42 of the lower lid 24, during the jumpily displacement of the mass member 20 within the accommodation space 18, the accommodation space 18 needs to be dimensioned to have an inside axial length that is made larger than the sum of the largest axial dimension of the mass member 20 in its static state and the axial length of the lower cushioning cover 46 that is elastically deformed due to the weight of the mass member 20. However, the mass member 20 is just required to make a jumpily displacement enough to apply repeatedly effective loads (i.e., active loads) to the hollow housing 16. Namely, the abutting surface 72 of the lower cushioning cover 46 is not necessarily required to be actually spaced away from the bottom surface 42 of the lid 24. In the present embodiment, particularly, the mass member 20 is forced to be displaced in a direction generally conforming to a gravitational direction so that the mass member 20 is restored to its static (initial) position owing to the gravity acting thereon. Therefore, the upper cushioning cover 44 needs not to be held in abutting contact with the upper wall surface of the recess 26 of the housing body 22, when vibrations to be damped are applied to the vibration-damping device 10. The vibration-damping device 10 is capable of exhibiting a desired vibration damping effect based on repeated loads effectively acting on the housing member 16 caused only by the abutting contact of the lower cushioning cover 46 on the lower lid 24.

Figure 6:
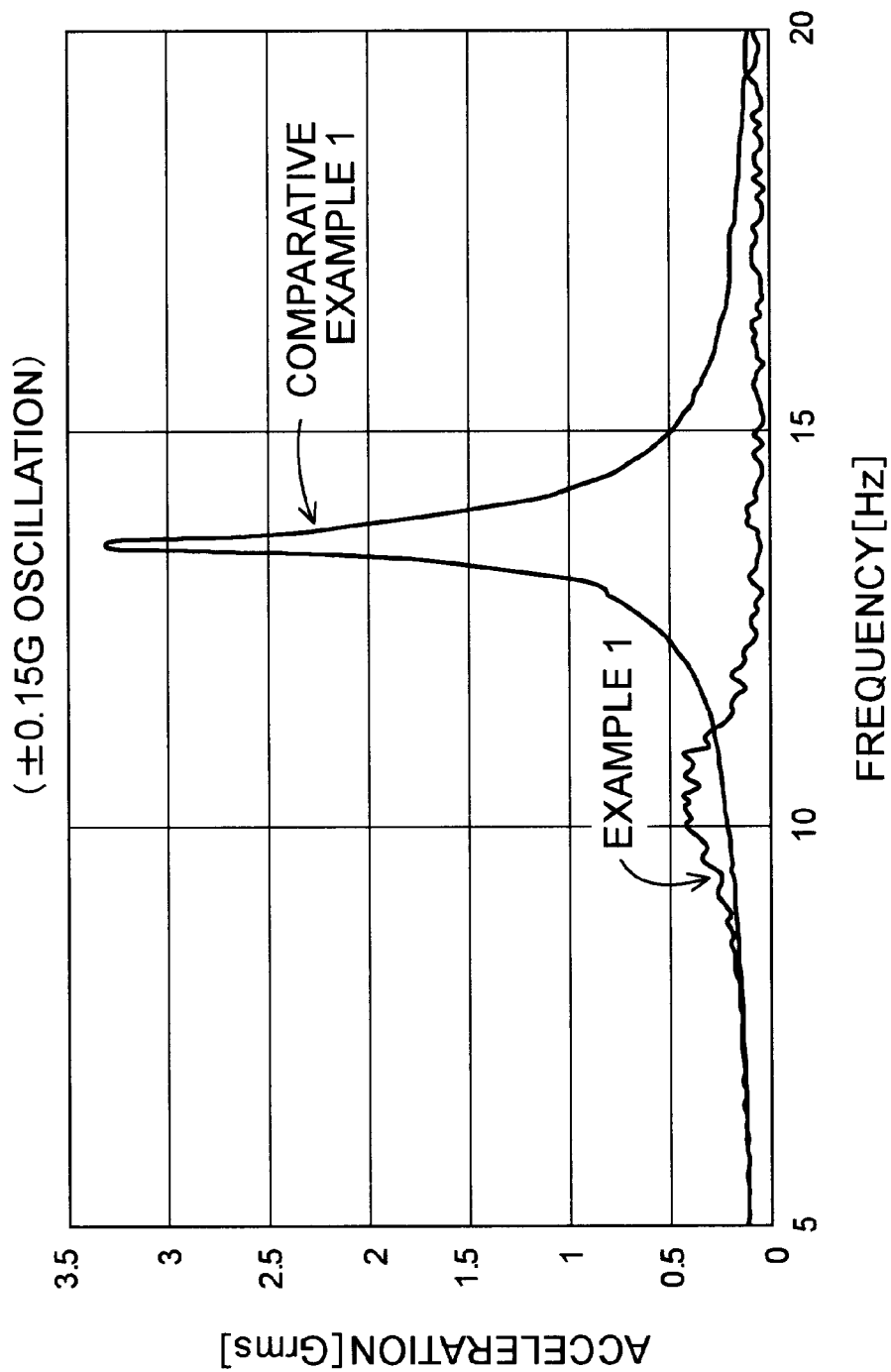
FIG. 6 is a graph showing frequency characteristics of damping effects measured in the vibration-damping device of FIG. 1, together with those measured in a vibration-damping device according to a comparative example.

An example of the vibration-damping device 10 constructed according to the present embodiment was installed on a vibrative member of resonance type, whose resonance amplitude magnification is maximized at a specific frequency range. Then, vibration-damping characteristics of the vibration-damping device 10 were actually measured by means of an acceleration sensor attached to the vibrative member, when the vibrative member was oscillated. The results of the measurements are indicated in the graph of FIG. 6 as an example 1. In the graph of FIG. 6, a vertical axis represents output values of the acceleration sensor. A comparative example was formed by fixing the three mass members 20 to the hollow housing member 16 so as to inhibit displacements of these three mass members 20 in relation to the hollow housing member 16. Vibration-damping characteristics of the comparative example were also measured in the same manner. The results of the measurements are also indicated in the graph of FIG. 6 as the comparative example 1. As is understood from the graph of FIG. 6, the vibration-damping device 10 constructed according to the present embodiment is capable of exhibiting a significantly high vibration damping effect with respect to low frequency vibrations based on effects of repeated impact of the mass members 20 on the hollow housing member 16 caused by free displacements of these mass members 20 within the hollow housing member 16.

Figure 7:
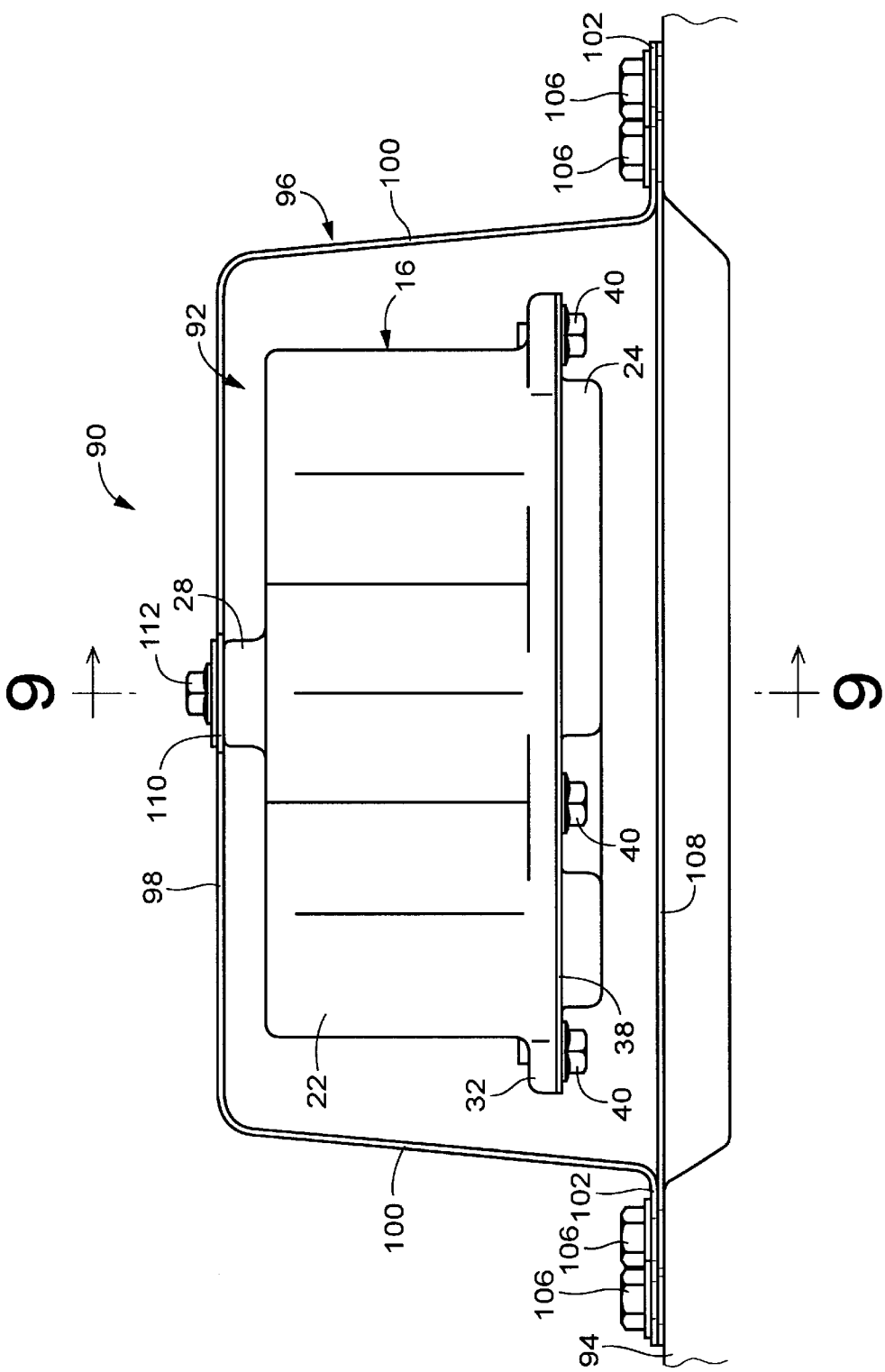
FIG. 7 is a front elevational view of a vibration-damping device constructed according to a second embodiment of the invention.
Figure 8:
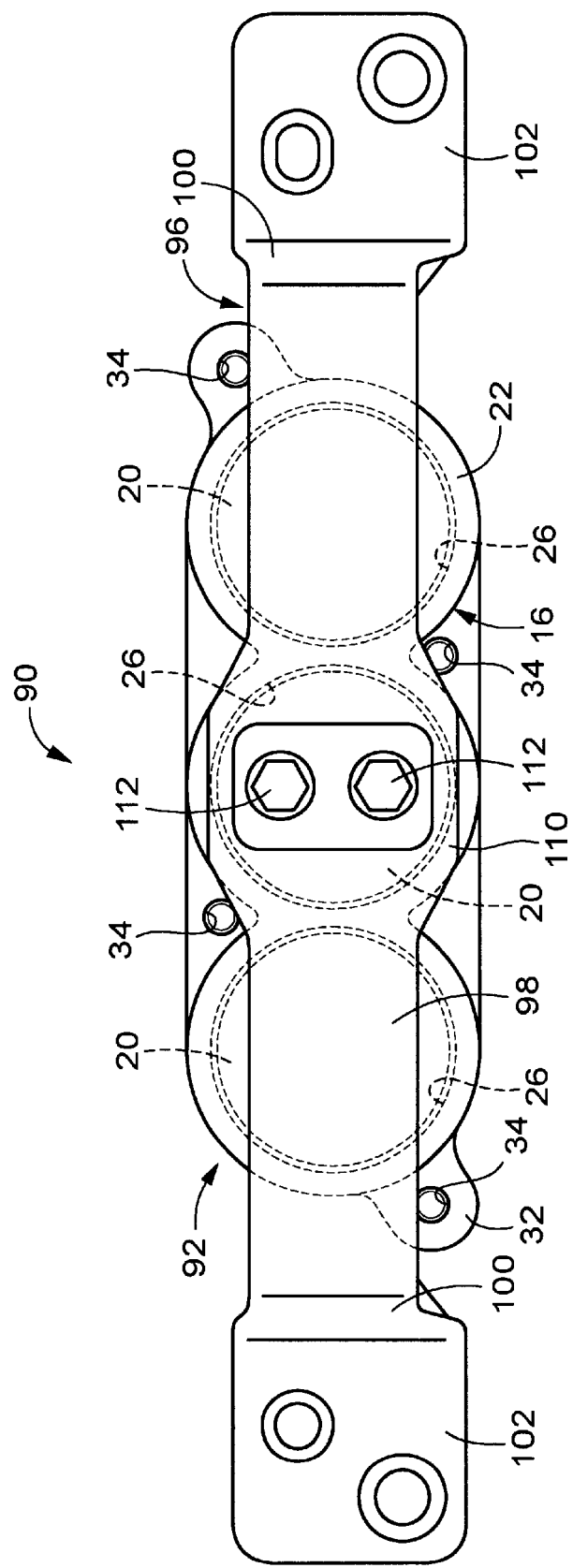
FIG. 8 is a top plane view of the vibration-damping device of FIG. 7.
Figure 9:
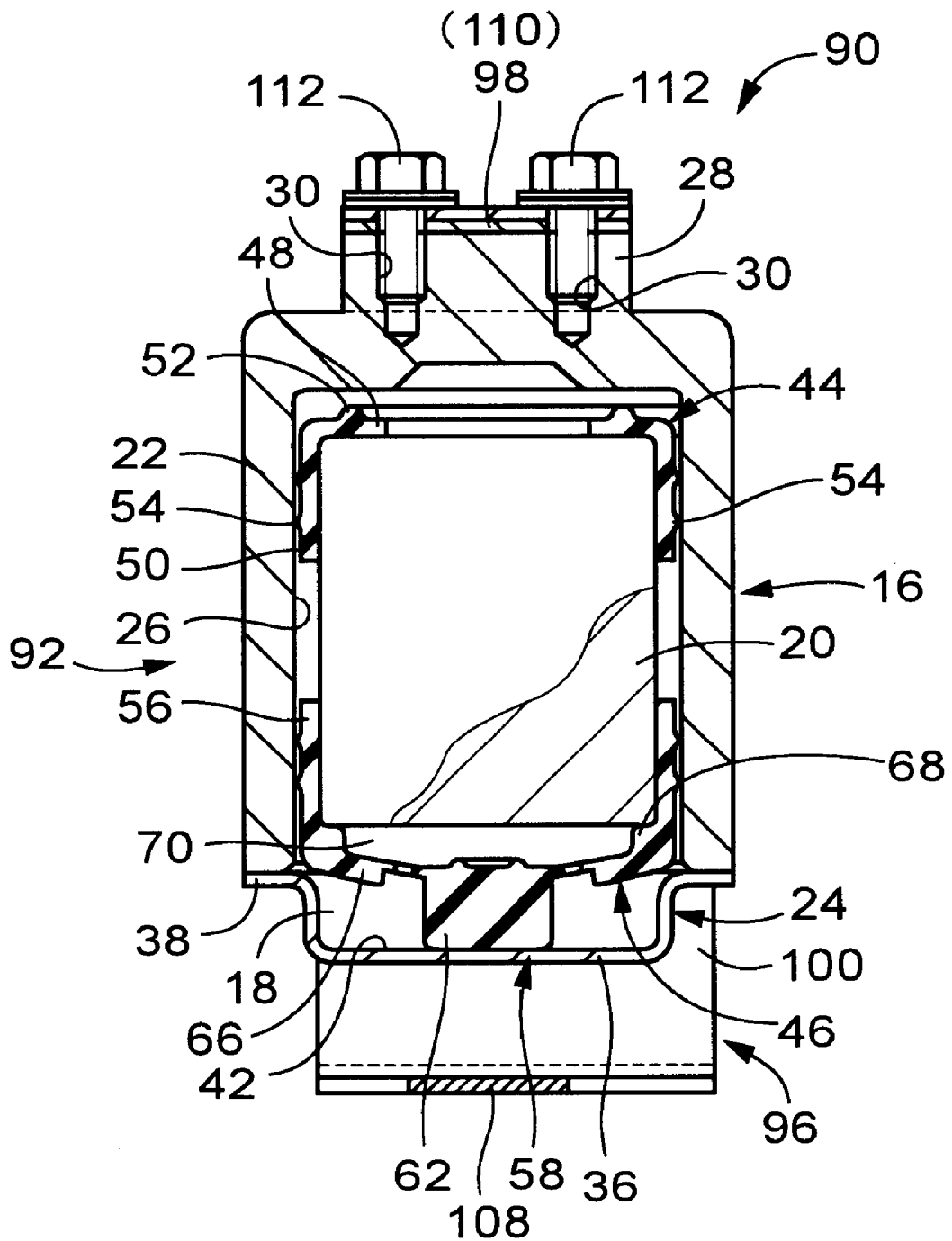
FIG. 9 is a cross sectional view taken along line 9—9 of FIG. 7.

Referring next to FIGS. 7–9, there will be described a second embodiment of this invention also in the form of a vibration damper unit 90. In the interest of brevity and simplification, the same reference numerals as used in the first embodiment will be used in the second embodiment to identify the corresponding components, and redundant description of these components will not be provided.

The vibration damper unit 90 includes a vibration-damping device 92 that is identical in construction with the vibration-damping device 10 of the first embodiment. This vibration-damping device 92 is mounted on a vibrative member 94 like a body of the automotive vehicle via a gate-shaped leaf spring 96, such that the vibration-damping device 92 is elastically suspended and supported by the gate-shaped leaf spring 96 that is fixed to the vibrative member 94.

The gate-shaped leaf spring 96 is formed of a spring-steel sheet with a generally constant width, and is shaped by bending to have a top plate portion 98 extending horizontally and a pair of leg portions 100, 100 integrally formed at longitudinally opposite end portions of the top plate portion 98 so as to extend downwardly in the vertical direction. The pair of leg portions 100, 100 are also bent at their lower end portions in the longitudinally outward direction to thereby provide fixing plate portions 102, 102. Thus, the gate-shaped leaf spring 96 is placed at its fixing plate portions 102, 102 on the vibrative member 94 and fixed to the vibrative member 94 by means of a plurality of fixing bolts 106. The fixing plate portions 102, 102 of the gate-shaped leaf spring 96 are connected with each other via a plane longitudinal connecting plate 108. The connecting plate 108 extends across a longitudinal space between the fixing plate portions 102, 102 and is connected at its longitudinally opposite end portions to the fixing plate portions 102, 102 by welding. The provision of the connecting plate 108 is effective to fix the positions of the fixing plate portions 102, 102 relative to each other, thereby assuring high stability of the entire shape of the gate-shaped leaf spring 96.

In the gate-shaped leaf spring 96, the top plate portion 98, the pair of leg portions 100, 100 and the connecting plate 108 cooperate to form a generally rectangular space defined thereby, for accommodating the vibration-damping device 92 within this rectangular space. As mentioned above, no redundant description about the vibration-damping device 92 is provided, since the vibration-damping device 92 is structurally identical with the vibration-damping device 10 of the first embodiment. The support projection 28 of the hollow housing member 16 of the vibration-damping device 92 is superposed onto a relatively wide support portion 110 formed at a longitudinally central portion of the top plate portion 98 of the gate-shaped leaf spring 96, and firmly fixed to the support portion 110 by means of two bolts 112.

The vibration damper unit 90 constructed according to the second embodiment, the vibration-damping device 92 is elastically connected to the vibrative member 94 functioning as a primary vibration system via the gate-shaped leaf spring 96. Therefore, the vibration-damping device 92 and the gate-shaped leaf spring 96 cooperate to form a secondary vibration system wherein the vibration-damping device 92 functions as a mass member while the gate-shaped leaf spring 96 functions as a spring member. That is, the vibration damper unit 90 is able to function as a dynamic damper in its entirety A natural frequency of the secondary vibration system may be tuned to a frequency range of vibrations to be damped excited in the vibrative member 94, by suitably adjusting the mass or weight of the vibration-damping device 92 and the dynamic spring constant of the gate-shaped leaf spring 96, making it possible for the vibration damper unit 90 to exhibit a desired damping effect with respect to the vibrative member 94.

In the vibration damper unit 90, particularly, the mass members 20 are housed within the vibration-damping device 92 such that the mass member 20 are independently displaceable relative to the hollow housing member 16 in a primary vibration input direction conforming to the vertical direction. When a vibrational load is applied to the vibration damper unit 90, the mass members 20 are forced to move back and force in the vertical direction in relation to the hollow housing member 16, thereby causing repeated impact of the mass member 20 on the hollow housing member 16. Thus, the vibration damper unit 90 is able to exhibit a further improved damping effect with respect to the vibrative member 94.

Figure 10:
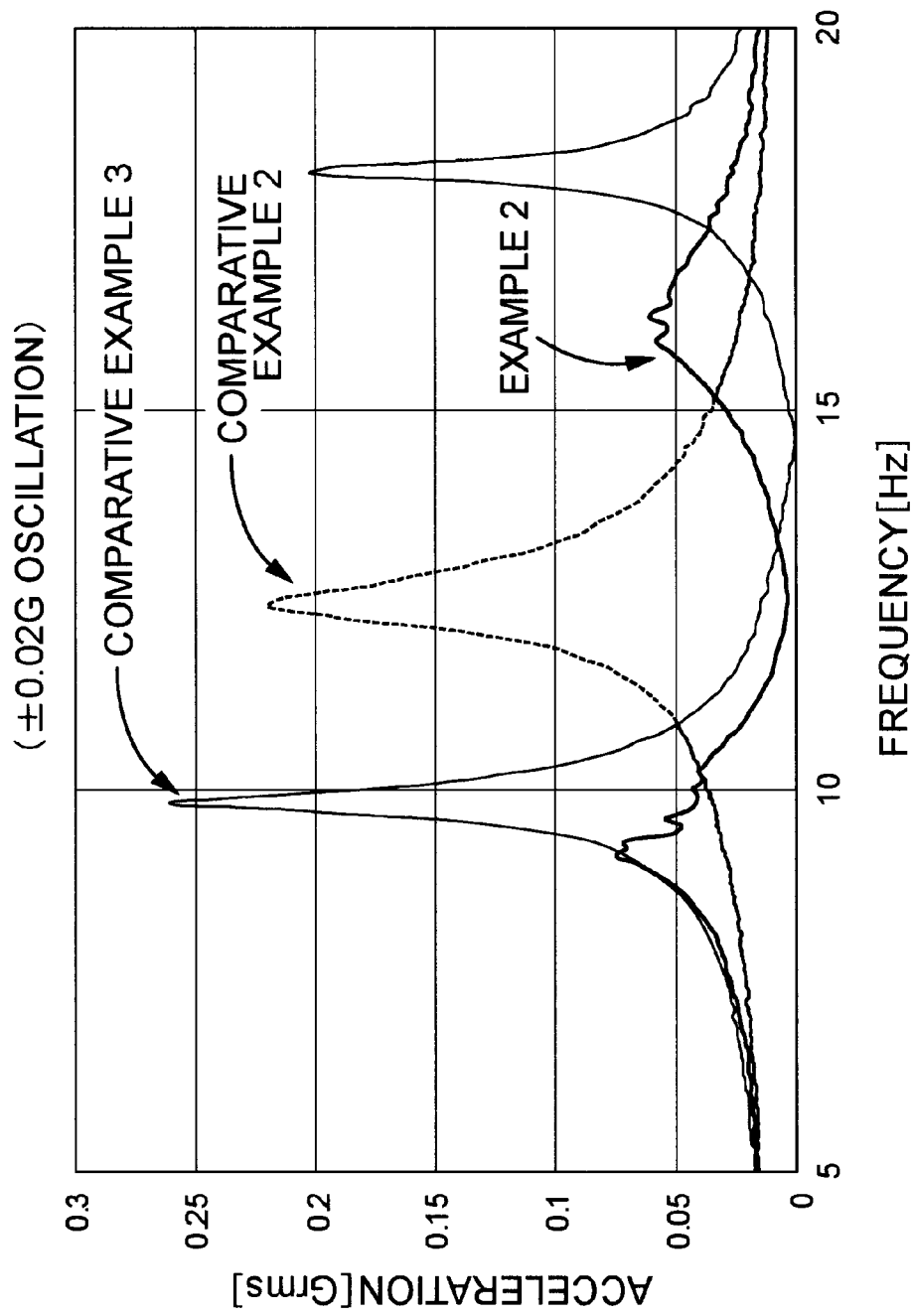
FIG. 10 is a graph showing frequency characteristics of damping effects measured in the vibration-damping device of FIG. 7, together with those measured in vibration-damping devices according to comparative examples.

An example of the vibration damper unit 90 constructed according to the present embodiment was installed on a vibrative member of resonance type, whose resonance amplitude magnification is maximized at a specific frequency range. Then, vibration-damping characteristics of the vibration-damper unit 90 were actually measured by means of an acceleration sensor attached to the vibrative member, when the vibrative member was oscillated. The results of the measurements are indicated in the graph of FIG. 10 as an example 2. In the graph of FIG. 10, a vertical axis represents output values of the acceleration sensor. Output values of the acceleration sensor were detected when the vibrative member with no vibration damper attached was oscillated. The obtained measurements are indicated in the graph of FIG. 10 as a comparative example 2. Another comparative example was formed by fixing the three mass members 20 to the hollow housing member 16 so as to inhibit displacements of these three mass members 20 in relation to the hollow housing member 16. Vibration-damping characteristics of this comparative example were also measured in the same manner. The results of the measurements are also indicated in the graph of FIG. 10 as a comparative example 3. As is understood from the graph of FIG. 10, the vibration damper unit 90 constructed according to the present embodiment is capable of exhibiting vibration damping effect with the help of the secondary vibration system or a dynamic damper including a mass component in the form of the vibration-damping device 92 and a spring component in the form of the gate-shaped leaf spring 96. In addition, the vibration damper unit 90 can exhibit a high damping effect with respect to low frequency vibrations based on the repeated impact of the mass members 20 on the hollow housing member 16 as a result of the free displacement of the mass members 20 within the hollow housing member 16.

While the present invention has been described in detail in its presently preferred embodiments, for illustrative purpose only, it is to be understood that the invention is by no means limited to the details of the illustrated embodiments, but may be otherwise embodied.

Figure 11:
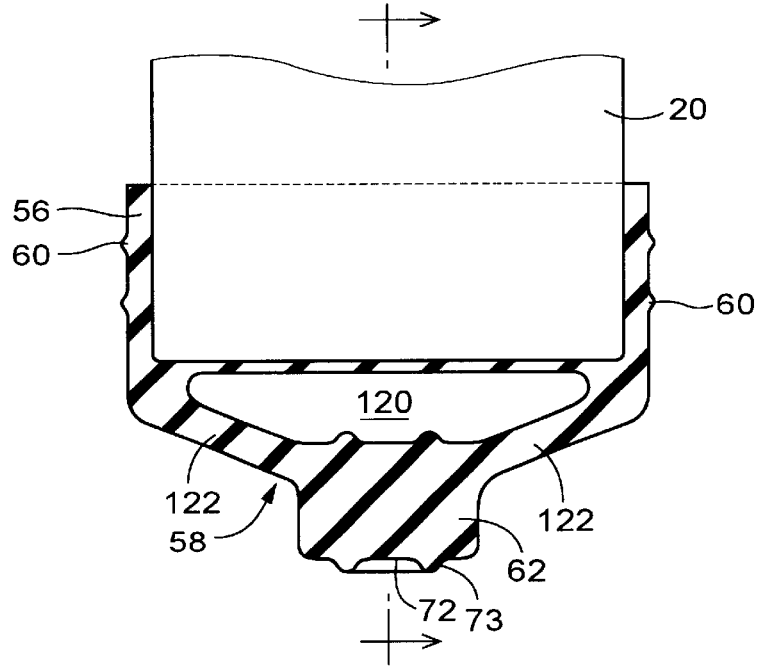
FIG. 11 is an axial or vertical cross sectional view of another example of the lower cushioning cover of the vibration-damping device of FIG. 1.
Figure 12:
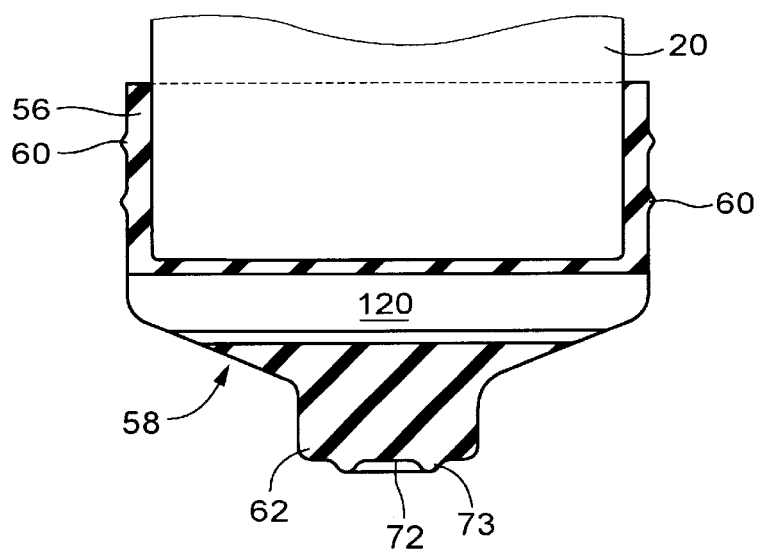
FIG. 12 is a cross sectional view taken along line 12—12 of FIG. 11.

For instance, the lower cushioning cover 46 to be fixed to each mass member 20 may have a variety of structure, but not specifically limited to the illustrated structure, as long as the lower cushioning cover 46 includes an abutting part to be brought into abutting contact with the hollow housing member 16 and a support portion with a desired shape that is subjected to shear deformation upon application of an abutting force to the abutting part. FIGS. 11 and 12 show one example of the lower cushioning cover, wherein a void 120 is formed so as to extend straightly in a radial direction perpendicular to its axial direction with a constant shape in cross section. Due to the presence of the void 120, a pair of tapered support portions 122, 122 are formed, such that the tapered support portions 122, 122 extend radially outwardly and axially outwardly from the abutting part 62 to the outer circumferential portion of the mass member 20. Another example of the lower cushioning cover is shown in FIG. 13, in which the mass member 20 is formed with a large-diameter circular recess 124 open in its axially lower end face, so that the outer peripheral portion of the open end face of the large-diameter circular recess 124 allows the bottom wall portion 58 to be disposed in a horizontal attitude with a plane disk-like shape, without inclining with respect to the axial direction of the lower cushioning cover.

The upper and/or the lower cushioning covers 44, 46 may be bonded to the mass member 20 at the same time when a rubber material is vulcanized for forming these upper and lower cushioning covers 44, 46. In particularly, if the lower cushioning cover 46 is formed with a void 120 in the form of a diametric through hole as shown in FIG. 11, the lower cushioning cover 46 can be bonded to the mass member 20 upon vulcanizing the rubber material in a general mold consisting of mold halves moved toward and away from each other in one direction to open and close the mold, for forming the lower cushioning cover 46, without needing a special mold.

While the illustrated vibration-damping device are arranged to exhibit a desired vibration damping effect with respect to vibrations applied in the vertical direction in the illustrated embodiment, the vibration-damping device of the present invention may be arranged to exhibit a desired damping effect with respect to vibrations applied thereto in the horizontal direction or an inclined direction and other various directions. When the vibration-damping device of this invention is adapted to damp vibrations applied thereto in the horizontal direction, the vibration-damping device 10 constructed according to the present embodiment is modified such that the accommodation space 18 and the mass members 20 are disposed in horizontal attitude, and both of axially opposite ends of each mass member 20 are equipped with the lower cushioning covers 46 having the abutting parts 62 and the elastic support parts 66, preferably.

The hollow housing member 16 and the mass members 20 may have a variety of shapes, but not limited to those in the illustrated embodiments. For instance, the hollow housing member 16 may be modified to have the accommodation space capable of housing one, two or not less than four mass members, or alternatively each mass member may be modified to have a diameter larger than its axial length, while taking into account a required damping characteristics or a given space for installing the vibration-damping device.

While the void 70 is exposed to the external area through the through holes 78, 78 formed through the elastic support part 66 in the illustrated embodiment, it may be possible to eliminate the use of the through holes 78, 78. Namely, the void 70 may be fluid-tightly closed so as to actively utilize an effect of an air spring, as needed.

It should be appreciated that the vibration-damping device of the present invention is applicable to an extremely wide fields, e.g, various kinds of vibrative members of an automotive vehicle, e.g., a body, a sub frame, an engine block, a sheet, members in a steering system, an instrumental panel, a door, a mirror, or other vibrative members other than vehicles.

It is also to be understood that the present invention may be embodied with various other changes, modifications and improvements, which may occur to those skilled in the art, without departing from the spirit and scope of the invention defined in the following claims.

What is claimed is:

1. A vibration-damping device for damping vibrations excited in a vibrative member, comprising:

a housing member adapted to be fixed to the vibrative member and defining an accommodation space therein;

a pillar-shaped mass member housed within said accommodation space of said housing member with a slight spacing therebetween so that said pillar-shaped mass member is independent of said housing member and is freely displaceable within said accommodation space of said housing member to come into impact on said housing member, said pillar-shaped mass member extending in a primary vibration input direction; and a rubber buffer and an abutting rubber member, which are integrally formed with each other and fixed to at least one of axially opposite end portions of said pillar-shaped mass member such that said rubber buffer covers an outer circumferential surface of said at least one of axially opposite end portions of said pillar-shaped mass member, and said abutting rubber member extends axially outwardly from said rubber buffer so that said abutting rubber member is disposed over an end face of said at least one of axially opposite end portions of said pillar-shaped mass member, and said pillar-shaped mass member comes into impact at a protruding end portion of said abutting rubber member on said housing member, wherein a void is formed between said abutting rubber member and said at least one of axially opposite end portions of said pillar-shaped mass member so that said abutting rubber member undergoes shear deformation upon an impact of said pillar-shaped mass member on said housing member at said protruding end portion of said abutting rubber member.

2. A vibration-damping device according to claim 1, wherein said rubber buffer and said abutting rubber member are integrally formed with each other to form an end rubber member, which is independent of said pillar-shaped mass member, and is firmly assembled by press-fitting onto said at least one of axially opposite end portions of said pillar-shaped mass member.

3. A vibration-damping device according to claim 1, wherein a principal elastic axis of said abutting rubber member is arranged to extend through a center of gravity of said pillar-shaped mass member, and said abutting rubber member has an abutting surface to be brought into abutting contact with said housing member, which is defined by a plane extending in a direction perpendicular to said principal elastic axis of said abutting rubber member.

4. A vibration-damping device according to claim 1, wherein said housing member includes a plane surface which is opposed to said abutting rubber member, and which extends in a radial direction perpendicular to a central axis of said pillar-shaped mass member over an area larger than an abutting area to which said abutting rubber member is brought into abutting contact with said housing member.

5. A vibration-damping device according to claim 1, wherein said abutting rubber member is formed with a through hole through which said void is exposed to said accommodation space.

6. A vibration-damping device according to claim 1, further comprising a cushioning projection formed at a portion of an inner surface of said abutting rubber member defining said void, so as to be opposed to and protrude toward said pillar-shaped mass member, in a direction of a central axis of said pillar-shaped mass member.

7. A vibration-damping device according to claim 1, wherein said abutting rubber member is formed by using a mold whose parting line is arranged to be spaced away form a molding surface for forming an abutting surface to be brought into abutting contact with said housing member.

8. A vibration-damping device according to claim 1, wherein said accommodation space defined within said housing member is fluid-tightly closed from an external area.

9. A vibration-damping device according to claim 1, wherein said abutting rubber member includes: a block-shaped abutting part disposed in a coaxial relationship with said pillar-shaped mass member and located axially outward of said at least one of axially opposite end portions of said pillar-shaped mass member with a spacing therebetween, said block-shaped abutting part being brought into abutting contact with said housing member at an abutting surface thereof, which is smaller than said end face of said at least one of axially opposite end portions of said pillar-shaped mass member; and an elastic support part extending axially outwardly and radially outwardly from an outer peripheral portion of said block-shaped abutting part toward an outer peripheral portion of said at least one of axially opposite end portions of said pillar-shaped mass member so as to elastically connect said block-shaped abutting part to said pillar-shaped mass member, such that a principal elastic axis of said elastic support part extends along with a central axis of said pillar-shaped mass member, and said elastic support part is subjected to shear deformation upon impact of said pillar-shaped mass member on said housing member at said abutting surface of said block-shaped abutting part of said abutting rubber member.

10. A vibration-damping device according to claim 9, wherein one of axially opposite end portions of said elastic support part located on a side of said pillar-shaped mass member, is superposed on and supports an outer peripheral portion of said end face of said at least one of axially opposite end portions of said pillar-shaped mass member.

11. A vibration-damping device according to claim 9, wherein a wall thickness of said elastic support part is partially reduced to adjust spring characteristics thereof.

12. A vibration-damping device according to claim 1, wherein said housing member is adapted to be directly fixed to the vibrative member so that vibrations excited in the vibrative member are directly applied to said housing member.

13. A vibration-damping device according to claim 1, wherein said housing member is adapted to be fixed to the vibrative member via a spring member so that vibrations excited in the vibrative member are indirectly applied to said housing member via said spring member.

14. A vibration-damping device according to claim 1, wherein said pillar-shaped mass member has a mass within a range of 10–1000 g.

15. A vibration-damping device according to claim 1, wherein said rubber buffer covering said outer circumferential surface of said at least one of axially opposite end portions of said pillar-shaped mass member is opposed to an inner surface of said housing member in diametrically opposite sides thereof with a spacing therebetween so that said pillar-shaped mass member is able to travel by a distance of 0.1–1.6 mm in a diametric direction thereof.

16. A vibration-damping device according to claim 1, wherein a total mass of said pillar-shaped mass member is held within a range of 5–15% of a mass of the vibrative member.

17. A vibration-damping device according to claim 1, wherein said pillar-shaped mass member comes into impact at axially opposite end portions thereof on respective abutting surfaces of said housing member, which abutting surfaces are opposed to each other in said primary vibration input direction with said pillar-shaped mass member interposed therebetween.

18. A vibration-damping device according to claim 17, wherein said pillar-shaped mass member is able to travel between said abutting surfaces of said housing member by a distance of 0.1–1.6 mm in said primary vibration input direction.

19. A vibration-damping device according to claim 1, wherein said primary vibration input direction extends approximately in a vertical direction, and said rubber buffer and said abutting rubber member are fixed to an axially lower end portion of said pillar-shaped mass member.

* * * * *